(12) United States Patent
Huo et al.

(10) Patent No.: US 7,706,346 B2
(45) Date of Patent: Apr. 27, 2010

(54) HYBRID WIRELESS COMMUNICATIONS SYSTEM

(75) Inventors: David D. Huo, Newton, NJ (US); Farooq Ullah Khan, Monmouth, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1539 days.

(21) Appl. No.: 10/842,701

(22) Filed: May 10, 2004

(65) Prior Publication Data
US 2005/0249177 A1 Nov. 10, 2005

(51) Int. Cl.
*H04B 7/216* (2006.01)
(52) U.S. Cl. ...................................... 370/342; 370/335
(58) Field of Classification Search ................. 370/335, 370/342, 203; 455/435.1
See application file for complete search history.

(56) References Cited

U.S. PATENT DOCUMENTS

2005/0063345 A1* 3/2005 Wu et al. ..................... 370/335
2008/0069055 A1* 3/2008 Seidel et al. ................. 370/335

OTHER PUBLICATIONS

International European Search Report (EP 05 25 2542) dated Aug. 25, 2005.

* cited by examiner

*Primary Examiner*—Lester Kincaid
*Assistant Examiner*—Phuoc Doan
(74) *Attorney, Agent, or Firm*—Williams, Morgan & Amerson

(57) ABSTRACT

A method that employs aspects of CDMA and OFDM modulation for controlling transmissions between a mobile station and a base station is provided. The method comprises forming a frame having a plurality of slots therein and then using CDMA modulation in a first portion of the plurality of slots, and using OFDM modulation in a second portion of the plurality of slots.

8 Claims, 6 Drawing Sheets

90 OFDM subcarriers

90 OFDM subcarriers

P - Pilot

HYBRID WIRELESS COMMUNICATIONS SYSTEM

BACKGROUND OF THE INVENTION

1. Field of the Invention

This invention relates generally to telecommunications, and more particularly, to wireless communications.

2. Description of the Related Art

Within wireless communications, a variety of transmission techniques are employed. Two relatively common techniques are Code Division Multiple Access (CDMA) and Orthogonal Frequency Division Multiplexing (OFDM). CDMA is a modulation and multiple access technique where multiple users employing different orthogonal Walsh codes can be multiplexed onto a common frequency carrier. CDMA has been used in various wireless communications systems due to its useful properties of interference averaging and multipath diversity. Those skilled in the art will appreciate that spreading the signals in a CDMA system provides sufficient processing gain to allow decoding transmissions received at very low carrier-to-interference ratio (C/I). Therefore, a CDMA transmission can withstand high levels of interference, allowing deployments with universal frequency reuse (same frequency used in all the sectors in the system). Examples of wireless communications systems that employ CDMA are second generation IS-95 systems and third generation cellular systems, such as UMTS (Universal Mobile Telecommunications System) and cdma2000. CDMA is also used in the IEEE 802.11b standard for wireless LANs (Local Area Networks).

In a CDMA downlink (base station to mobile station), the transmissions on different Walsh codes are orthogonal when they are received at the mobile station. This is due to the fact that the signal is transmitted from a fixed location (base station) on the downlink and all the Walsh codes are received synchronized. Therefore, in the absence of multipath signals, transmissions on different codes do not interfere with each other. However, in the presence of multipath propagation (typical of cellular environments), the Walsh codes are no longer orthogonal, and thus, interfere with each other, producing Inter-Symbol Interference (ISI) and Multiple Access Interference (MAI). ISI and MAI limit the maximum achievable Signal-to-Noise Ratio (SNR), thereby limiting the maximum data rate that may be supported.

The problem is also present on a CDMA uplink (mobile station to base station) because the received Walsh codes from multiple users are not orthogonal even in the absence of any multipath signals. In the uplink, the propagation times from mobiles at different locations to the base station are often different. The received codes are not synchronized when they arrive at the base station, and therefore orthogonality cannot be guaranteed for signals coming from different mobiles. Transmissions from multiple users interfere with each other, generating Multiple Access Interference (MAI) and therefore contributing to the noise rise seen by each of the users. In general, the noise rise at the base station is kept below a certain threshold called the rise-over-thermal (RoT) threshold in order to guarantee desirable system capacity and coverage. The circuitry of the base station generates a certain amount of temperature dependent noise called thermal noise. The RoT threshold limits the amount of power above the thermal noise at which mobiles transmissions can be received. The threshold, along with interference from other users, limits the achievable data rates and capacity for transmissions on the CDMA uplink.

A stylized representation of a conventional OFDM transmitter chain 100 is shown in FIG. 1. Generally, a set of information bits called an encoder packet is coded, interleaved and modulated into Q symbols and I symbols by hardware/software/firmware 105. A group of the I and Q symbols are serial-to-parallel converted by a de-multiplexer 110 and mapped to available subcarriers. Unused subcarriers are filled with zeros, and thus, carry no symbols, as stylistically represented at 115. At 120 an IFFT (Inverse Fast Fourier Transform) operation is performed on the subcarrier symbols and the resulting symbols are parallel-to-serial converted by a multiplexer 125 to form a time-domain signal that is quadrature modulated and converted to an RF frequency for transmission by hardware/software/firmware 130. In some embodiments of the OFDM transmitter chain 100, a baseband filter 135 may be employed prior to converting to the RF frequency.

OFDM does not suffer some of the problems associated with CDMA. For example, ISI is substantially reduced by using longer symbol durations in OFDM. Moreover, the transmissions occur on orthogonal subcarriers without generating any Multiple Access Interference (MAI). In an OFDM system, a high data rate stream is converted from parallel to serial, resulting in a lower rate on each of the parallel streams. A lower rate on each of the streams allows using longer symbol duration. The multiple parallel data streams are mapped to orthogonal subcarriers in OFDM. The OFDM modulation efficiently uses the radio spectrum by placing modulated subcarriers as close as possible without causing Inter-Carrier Interference (ICI). Owing, at least in part, to its superior performance, OFDM modulation has been adopted in various standards, most notably digital audio broadcast (DAB), digital video broadcast (DVB), asymmetric digital subscriber line (ADSL), IEEE LAN (802.11a and 802.11g) and IEEE MAN 802.16a. OFDM modulation is also being considered for various next generation wireless standards.

While OFDM provides some benefits over CDMA, it also lacks some of the benefits of CDMA, such as interference averaging and absence of spreading (processing gain). Thus, OFDM may be limited to deployments with a frequency reuse factor of greater than 1, resulting in inefficient use of the scarce radio spectrum.

The present invention is directed to overcoming, or at least reducing, the effects of, one or more of the problems set forth above.

SUMMARY OF THE INVENTION

In one embodiment of the present invention, a method for controlling transmissions between a mobile station and a base station is provided. The method comprises forming a frame having a plurality of slots therein. CDMA modulation is used in a first portion of the plurality of slots, and OFDM modulation is used in a second portion of the plurality of slots.

BRIEF DESCRIPTION OF THE DRAWINGS

The invention may be understood by reference to the following description taken in conjunction with the accompanying drawings, in which like reference numerals identify like elements, and in which.

Figure 1:
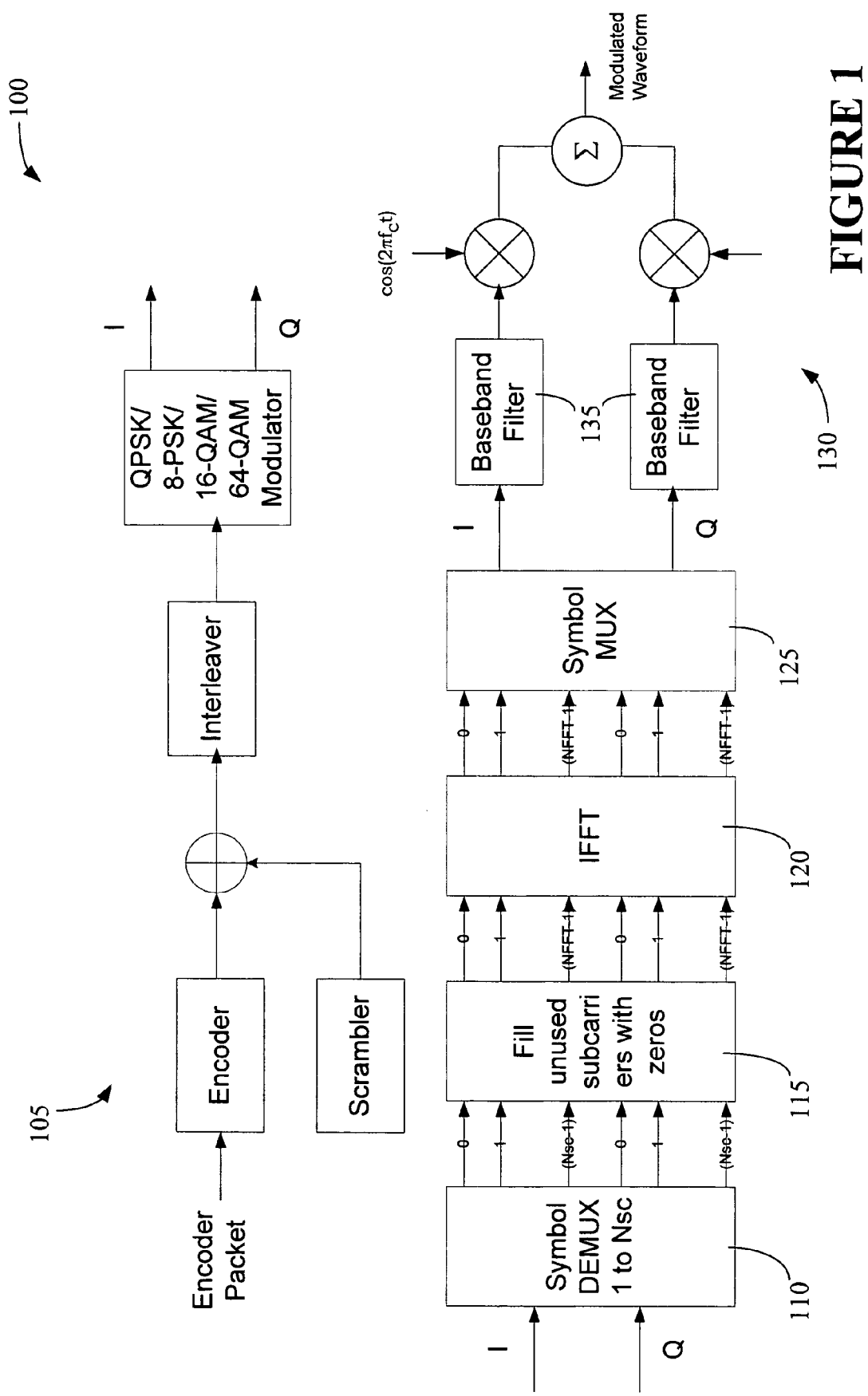
FIG. 1 illustrates a stylized representation of an OFDM transmitter chain.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a hybrid wireless communications system that incorporates aspects of both CDMA and OFDM is disclosed herein. This hybrid system advantageously employs desirable properties of both CDMA and OFDM modulation. In the present invention, CDMA is used for physical layer signaling and control (e.g. random access, resource requests, resource grants, synchronization and power control commands) while OFDM with Hybrid ARQ is used for user information transmission. One embodiment of the instant invention is described herein in the context of 1xEV-DO (a.k.a. HRPD) system parameters. However, those skilled in the art will appreciate that the principles of the present invention can also be applied to other wireless communications systems.

Figure 2:
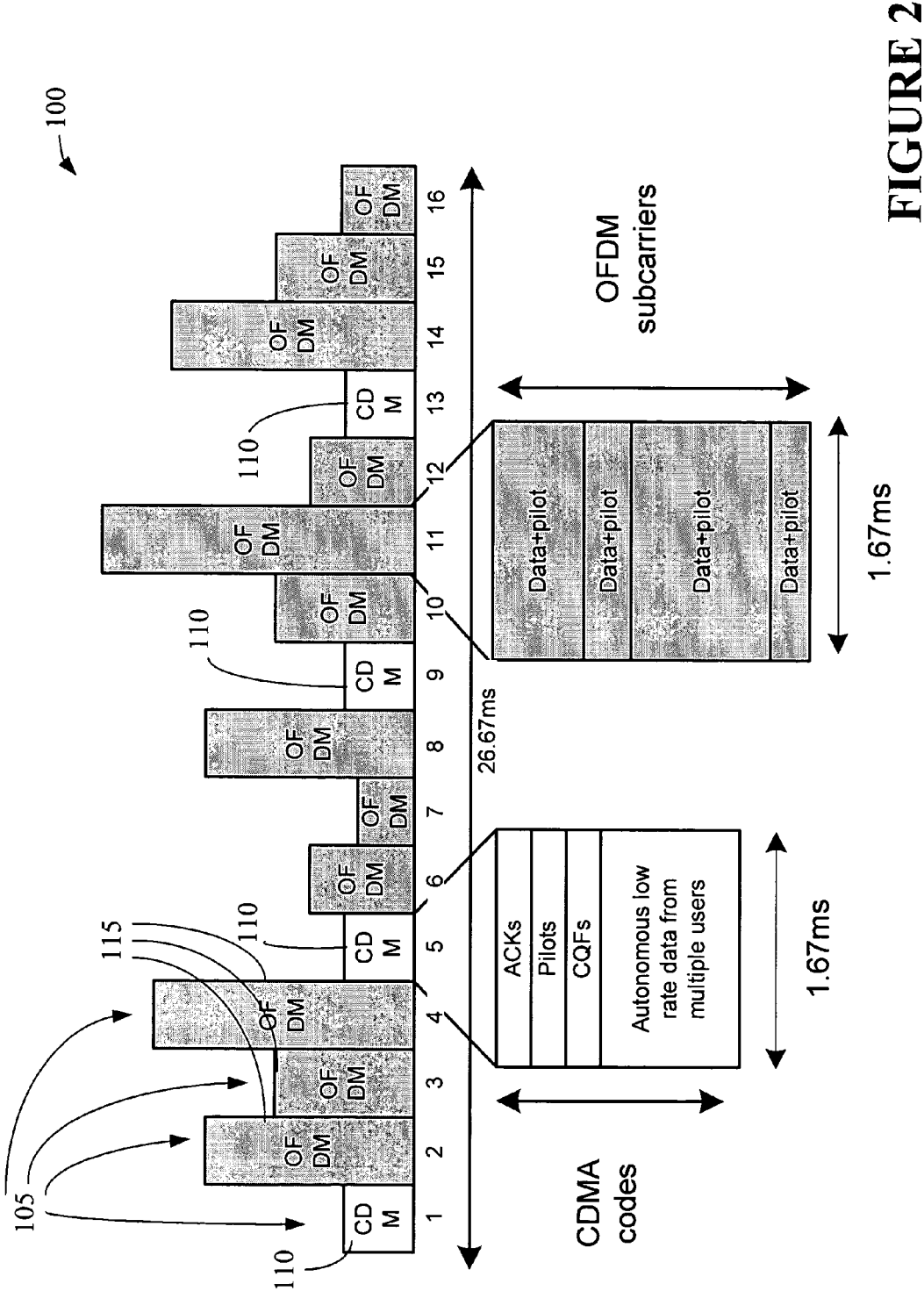
FIG. 2 illustrates a stylized representation of a signaling format that may be employed in an uplink channel in a hybrid CDMA/OFDM wireless system.

Turning now to the drawings, and referring specifically to FIG. 2, a stylized representation of a signaling format that may be employed over an uplink channel between mobile stations and a base station in a hybrid CDMA/OFDM wireless system is illustrated. The format comprises a frame 100 divided into a plurality of slots 105, where a first portion of the slots 110 are used for CDMA transmissions and a second portion of the slots 115 are used for OFDM transmissions.

The physical layer signaling in 1xEV-DO, among others, consists of pilot, channel quality feedback and ACK/NACK feedback for the HARQ operation, as shown for one of the power control slots 110 in FIG. 1. FIG. 1 shows an uplink channel having alternating CDMA power control (PC) slots 110 and OFDM slots 115. That is, the CDMA PC slots 110 are distributed throughout the frame to allow the mobile station to periodically update the power with which it transmits. Thus, a sufficient number of PC slots 110 should be provided to allow updating to occur on a sufficiently short and regular basis.

The transmissions in the power control slots 110 include physical layer control signaling and are power controlled, as in a conventional CDMA system. The Rise-over-Thermal (RoT) is kept below an RoT threshold in these PC slots 110 in order to increase the likelihood that an acceptable capacity/coverage to the critical physical layer control signaling. The OFDM slots 115 are used for user data transmissions in an OFDMA fashion, i.e. multiple users can potentially transmit on orthogonal subcarriers within the slots 115.

A dedicated pilot for each of the active users is carried in the CDMA slots 110. The pilot transmit power is updated with every CDMA slot 110 based on a Transmit Power Control (TPC) bit received from the base station on the Downlink. This allows the received pilot power to be substantially maintained at a desired level without creating excessive interference in the system. The OFDM transmissions can also be power controlled by allocating power in OFDM slots using the pilot transmit power as a reference. For example, a specified Traffic-to-Pilot Ratio (TPR) can be indicated to the mobile station via a scheduling grant message sent by the base station. The mobile station can then use this TPR to determine the power needed for transmission in the OFDM slots when it is scheduled for transmissions on the uplink.

Figure 3:
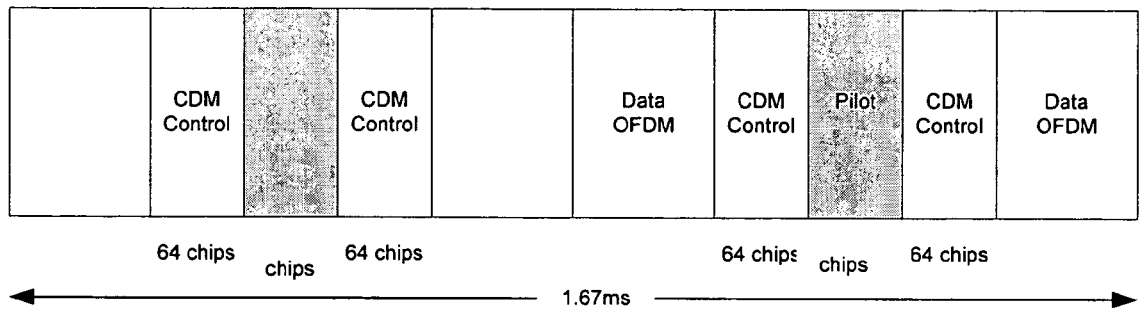
FIG. 3 illustrates a stylized representation of a signaling format that may be employed in a downlink channel in hybrid CDMA/OFDM wireless system.
Figure 4:
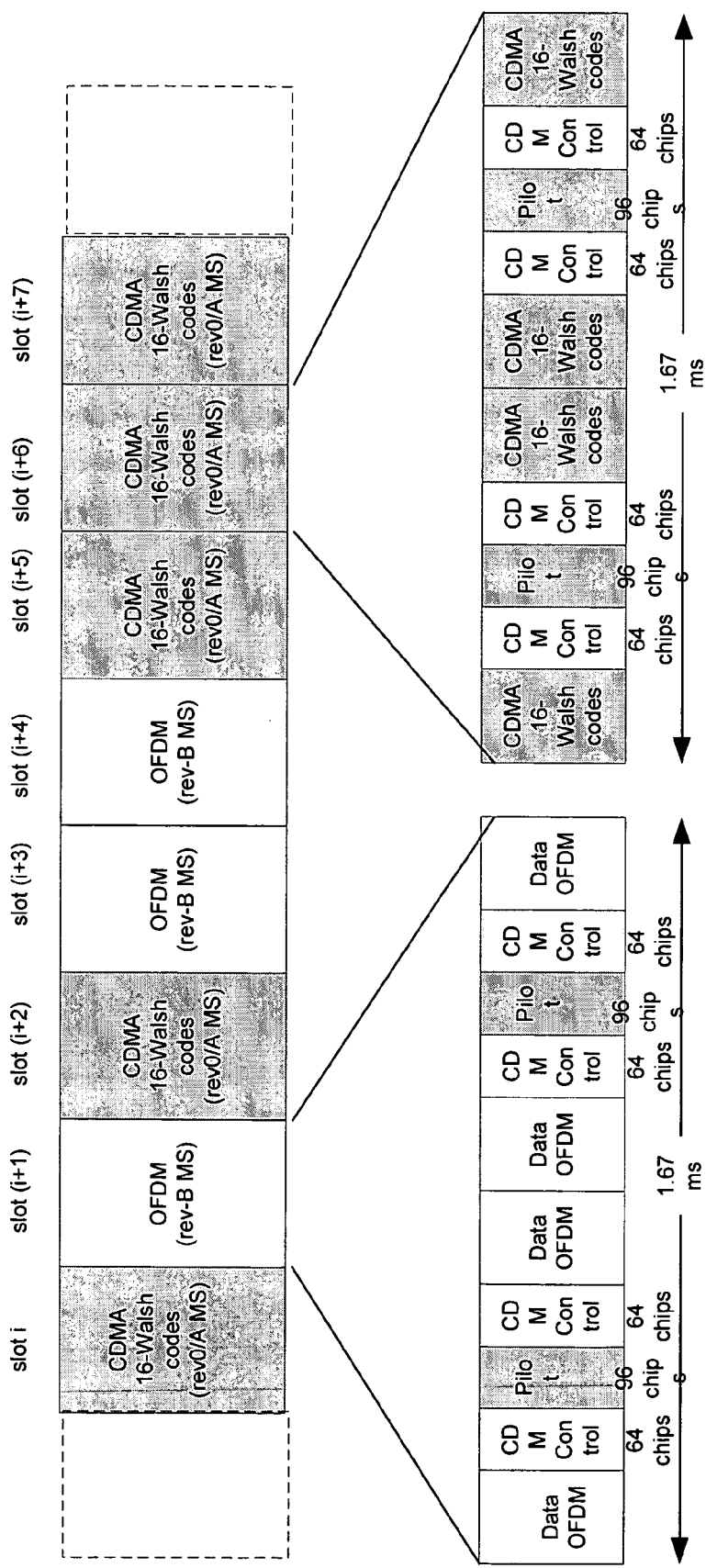
FIG. 4 illustrates a stylized representation of a downlink slot structure for both CDMA and OFDM type slots.

In the downlink, CDMA and OFDM symbols are time-multiplexed within a 1.67 ms slot on the same 1.25 MHz carrier, as shown in FIG. 3. The downlink slot structure is the same as in current HRPD revision 0 and revision A standards. The only substantial difference is that that CDMA chips in the "Data" fields have been replaced by OFDM symbols. This allows for new and legacy mobile stations to share the downlink resource on a slot-by-slot basis, as shown in FIG. 4. The pilot and MAC fields are unchanged and are present in all the slots (i.e., Idle slots, CDMA slots and OFDM slots). This allows for the legacy mobiles to operate seamlessly.

Figure 5:
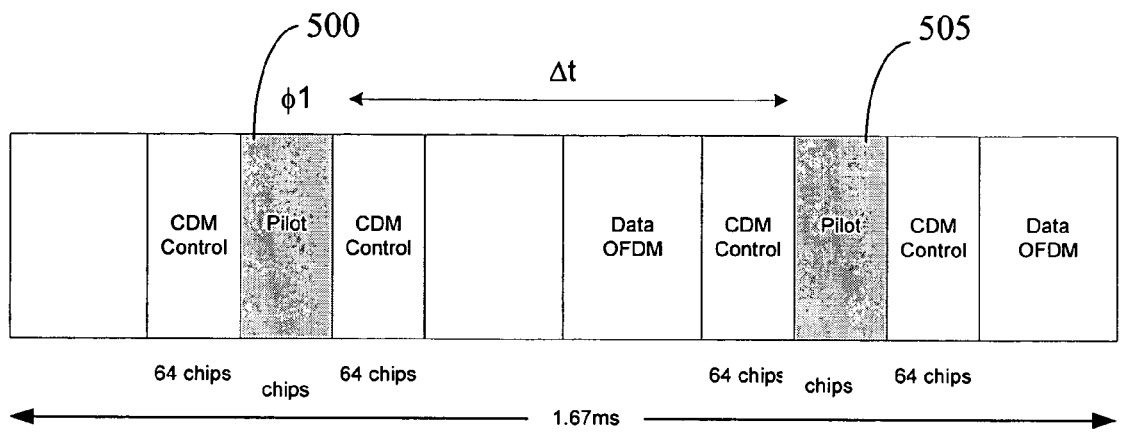
FIG. 5 illustrates a stylized representation of a method for using pilot signals in the signaling format of the downlink channel of FIG. 3 for detecting frequency error.

Downlink TDM (Time Division Multiplex) pilots may be used to estimate (and compensate) frequency error, as shown in FIG. 5. The frequency error can be determined based on the phase difference and time difference between the two TDM pilots within slots 500, 505 using the following equation:

$$\delta w = \frac{\phi_2 - \phi_1}{\Delta t}$$

Note that the time difference between the two TDM pilots is fixed and known to the receiver. The phase can be estimated based on the received pilot symbols. Similarly, on the uplink, CDM pilots in the power-controlled CDM slots (and embedded time-freq pilots in OFDM data slots) can be used to estimate the frequency error.

The information carried in the CDM slots on the uplink and pilot and MAC fields on the downlink is scrambled by PN codes used in the IS-95 wireless communication system. These PN codes can also be used to derive the synchronization and timing information for the OFDM transmissions. For example, timing derived from PN sequences can also be used for OFDM receiver's FFT (Fast Fourier Transform) window alignment.

Figure 6:
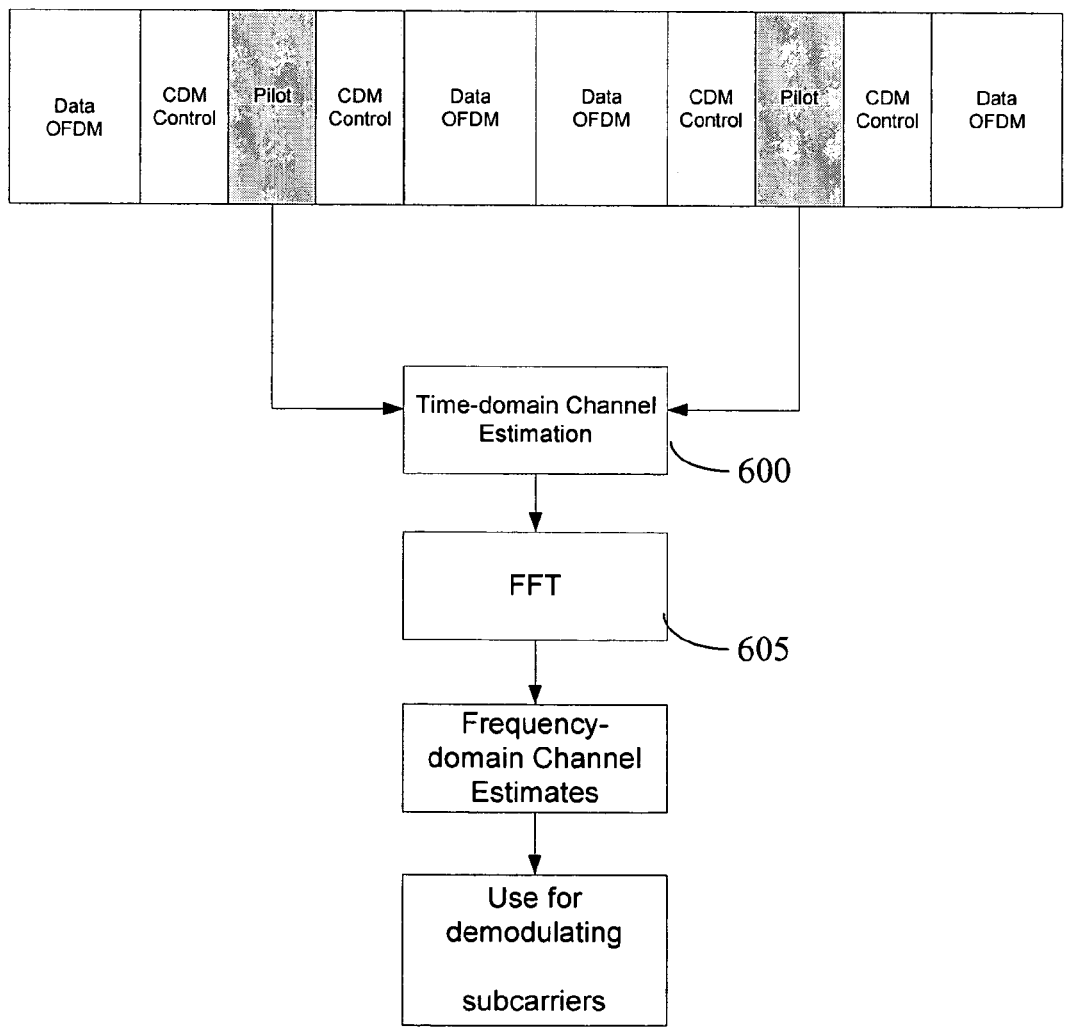
FIG. 6 illustrates a stylized representation of a method for using TDM pilots in the signaling format of the downlink channel of FIG. 3 for channel estimation for demodulation in the frequency domain.

The TDM pilots on the downlink can also be used for channel estimation for demodulation in the frequency domain (OFDM) as shown in FIG. 6. With the TDM pilots, the channel can be estimated in the time-domain (at 600) and then transformed to frequency domain by taking an FFT (fast fourier transform) (at 605) of the time-domain estimates. Similarly, dedicated CDMA pilots on the uplink can be used to provide uplink channel estimates in the frequency domain. Additional pilots in the frequency domain can also be provided in the OFDM slots both on the downlink and uplink in order to increase the reliability of the channel estimation. The final channel estimates can then be obtained based on both the time-domain and frequency domain pilots.

An exemplary set of system parameters for the hybrid CDMA/OFDM system is provided in Table 1 for illustration.

TABLE 1

| Parameter | Symbol | Value |
| --- | --- | --- |
| CDMA Chip rate | BW | 1.2288 Mchips/s |
| OFDM Sampling Frequency | Fs | 1.72032 Ms/s |
| Sampling frequency to channel bandwidth ratio | Fs/BW | 7/5 |
| OFDM FFT size | $N_{FFT}$ | 128 |
| OFDM subcarrier spacing | Df | 13.44 KHz |
| Useful symbol time | Tb = 1/Df | 74.4 ms |
| OFDM Cyclic prefix (guard period) DL-6.98 ms, UL-8.93 ms | Tg OFDM symbol time DL-81.38 ms, UL-83.33 ms | Tb + Tg OFDM Symbol rate |
| 1/(Tb + Tg) | DL-12.288 KHz | UL-12.0 KHz |

Figure 7:
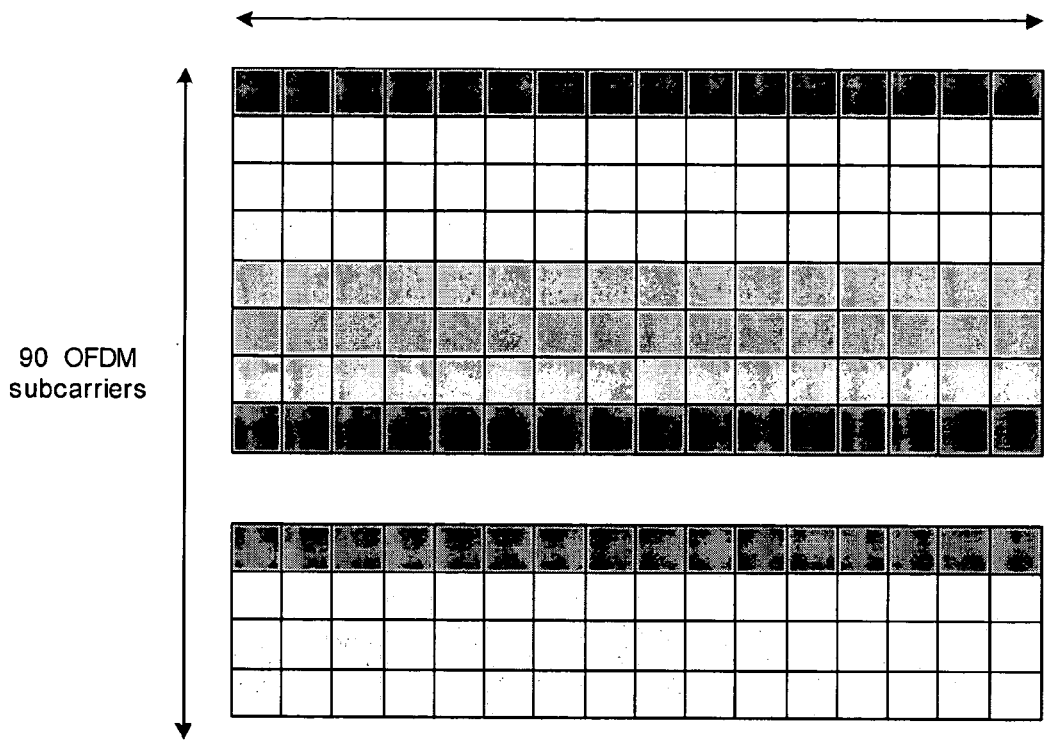
FIG. 7 illustrates exemplary downlink OFDM slot structures.
Figure 8:
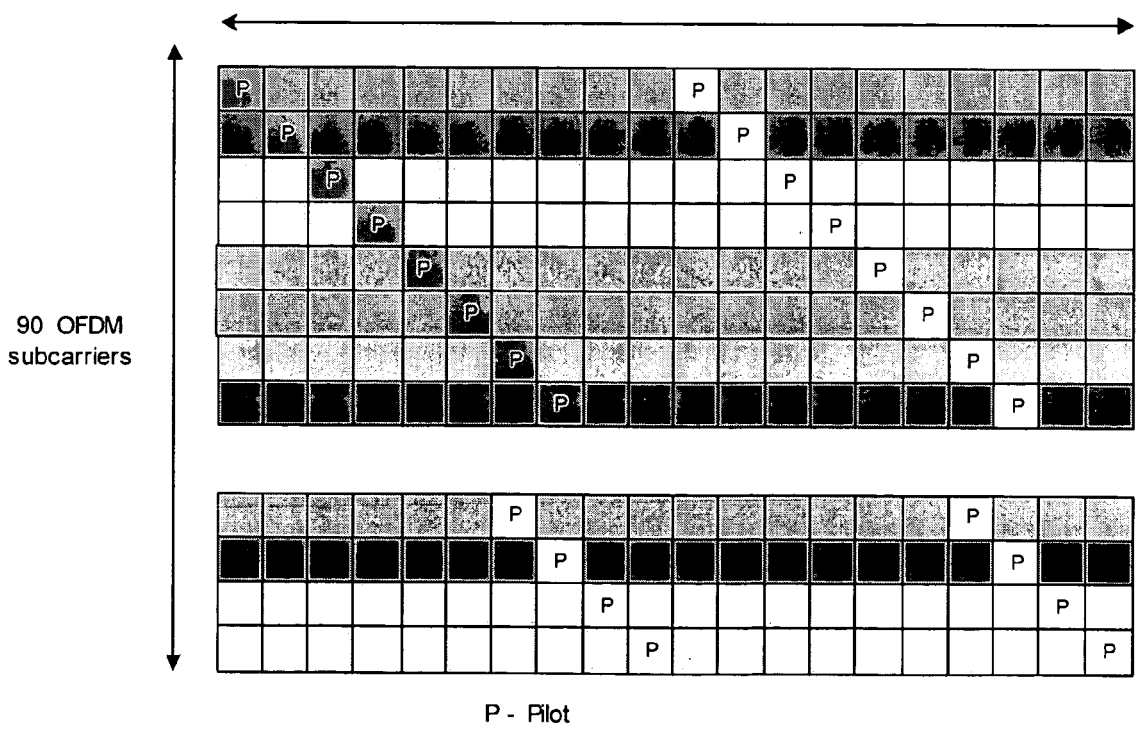
FIG. 8 illustrates exemplary uplink OFDM slot structures.

Exemplary downlink and uplink OFDM slot structures are shown in FIG. 7 and FIG. 8, respectively. Note that additional pilot symbols are shown in the uplink slot structure.

Exemplary uplink and downlink data rates, modulation and coding schemes are given in Table 2 and Table 3, respectively. The modulation and coding schemes are determined based on the assumption that all of the 90 subcarriers are used for transmission to a single user. Those skilled in the art will appreciate that the formats can be extended for the case where a subset of the 90 subcarriers is used for data transmission to a given user. Also, 192 pilot symbols and 1608 data symbols per slot are assumed for the uplink case.

TABLE 2

| Data Rate [Kb/s] | Information Block Size [bits] | Modulation Order | Effective Coding Rate |
| --- | --- | --- | --- |
| 76.8 | 128 | 2 | 0.040 |
| 153.6 | 256 | 2 | 0.080 |
| 307.2 | 512 | 2 | 0.159 |
| 460.8 | 768 | 2 | 0.239 |
| 614.4 | 1024 | 2 | 0.318 |
| 921.6 | 1536 | 2 | 0.478 |
| 1228.8 | 2048 | 3 | 0.425 |
| 1843.2 | 3072 | 3 | 0.637 |
| 2457.6 | 4096 | 4 | 0.637 |
| 3072 | 5120 | 4 | 0.796 |
| 3686.4 | 6144 | 6 | 0.637 |
| 4300.8 | 7168 | 6 | 0.743 |

TABLE 3

| DATA RATE [KB/S] | Information Block Size [bits] | Modulation Order | Effective Coding Rate |
| --- | --- | --- | --- |
| 76.8 | 128 | 2 | 0.044 |
| 153.6 | 256 | 2 | 0.089 |
| 307.2 | 512 | 2 | 0.178 |
| 460.8 | 768 | 2 | 0.267 |
| 614.4 | 1024 | 2 | 0.356 |
| 921.6 | 1536 | 2 | 0.533 |
| 1228.8 | 2048 | 3 | 0.474 |
| 1843.2 | 3072 | 4 | 0.533 |
| 2457.6 | 4096 | 4 | 0.711 |
| 3072 | 5120 | 4 | 0.889 |
| 3686.4 | 6144 | 6 | 0.711 |
| 4300.8 | 7168 | 6 | 0.830 |

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling transmissions between a mobile station and a base station, the method comprising:
    forming, in a wireless communication device, a frame having a plurality of slots therein within which to transmit information including physical layer signaling, control signaling, and user data:
    partitioning, in the wireless communication device, the frame into a first portion of the plurality of slots and a second portion of the plurality of slots;
    allocating, in the wireless communication device, said physical layer signaling and said control signaling to the first portion of the plurality of slots;
    allocating, in the wireless communication device, said user data to the second portion of the plurality of slots; and
    transmitting, from the wireless communication device, the frame of information using code division multiple access (CDMA) in the first portion of the plurality of slots and orthogonal frequency division multiplexing (OFDM) in the second portion of the plurality of slots, wherein using CDMA for at least one of physical layer signaling and control further comprises the physical layer signaling including at least one of pilot, channel quality feedback and ACK/NACK.

2. A method, as set forth in claim 1, wherein using CDMA in a first portion of the plurality of slots further comprises using CDMA power control slots.

3. A method, as set for in claim 2, wherein using CDMA power control slots further comprises distributing CDMA power slots throughout the frame.

4. A method, as set forth in claim 3, wherein distributing CDMA power slots throughout the frame further comprises distributing CDMA power slots substantially uniformly throughout the frame.

5. A method for controlling transmissions between a mobile station and a base station, the method comprising:

receiving, at a wireless communication device, a frame having a plurality of slots therein within which to transmit information, a first portion of the plurality of slots including at least one of physical layer signaling and control formed according to a code division multiple access (CDMA) protocol and a second portion of the plurality of slots including user data formed according to an orthogonal frequency division multiplexing (OFDM) protocol; wherein using CDMA to effect at least one of physical layer signaling and control further comprises the physical layer signaling including at least one of pilot, channel quality feedback and ACK/NACK.

6. A method, as set forth in claim 5, wherein CDMA being used in a first portion of the plurality of slots further comprises CDMA power control slots being used in a first portion of the plurality of slots.

7. A method, as set for in claim 6, wherein CDMA power control slots being used further comprises CDMA power slots being distributed throughout the frame.

8. A method, as set forth in claim 7, wherein CDMA power slots being distributed throughout the frame further comprises CDMA power slots being substantially uniformly distributed throughout the frame.

* * * * *